UNITED STATES PATENT OFFICE.

WALTER P. SCHUCK, OF PORTLAND, OREGON, ASSIGNOR TO SUPERIOR OIL AND PROCESS COMPANY, OF PORTLAND, OREGON, A CORPORATION.

PROCESS OF PURIFYING OILY MATERIALS.

1,260,072.　　　　　　　　Specification of Letters Patent.　　Patented Mar. 19, 1918.

No Drawing.　　　　Application filed August 31, 1916.　Serial No. 117,885.

*To all whom it may concern:*

Be it known that I, WALTER P. SCHUCK, a citizen of the United States, residing at Portland, in the county of Multnomah and State of Oregon, have invented certain new and useful Improvements in Processes of Purifying Oily Materials, of which the following is a specification.

The object of my present invention is the production of a process capable of readily, economically purifying and deodorizing oils, and thereby improving the same, and this purifying and deodorizing may be complete, or may be carried on to any desired extent.

Briefly stated, my process consists in distilling from the oil, in a current of hydrogen, those impurities which produce foul odors in the oil, or produce disagreeable flavors therein, or are particularly liable to undergo fermentative decomposition with the liberation of free acids and the like. It is also found that there is a certain amount of hydrogenation of the oil taking place, even when the process is carried out in such vessels as glass, which, so far as I have been able to find out, are not capable of catalytically effecting the union of hydrogen with the said oils.

Without limiting myself to the precise details, I give the following examples, for the purpose of more fully describing and explaining the invention.

*Example 1.*

Castor oil is heated to a temperature of about 185° C., and a moderately strong current of hydrogen gas is bubbled through the same while the oil is held at the stated temperature. After a period of one to one-and-one-half hours, it is found that the highly disagreeable odor and flavor of the oil has been removed, and a product remains which has a pleasant nutty odor. The iodin number of the oil will be found to have been reduced somewhat, and the product can be kept for a long time without getting rancid. The color is not changed.

*Example 2.*

Eel oil, heated to about 300° C., and hydrogen passed through, has its fishy odor and vile taste removed, by the passage of hydrogen therethrough, in one to two hours. The color is changed from reddish to golden yellow. It may then be used as a cooking oil.

*Example 3.*

Cod liver oil, treated at about 300° C. for one and one-half hours, likewise loses its odor and flavor. A sample so treated in a glass vessel, with a glass tube was used for the introduction of the hydrogen, was found to have its iodin number reduced from 154 to 109 in 1½ hours. Its color is unchanged.

*Example 4.*

Corn oil extracted by the naphtha process, has a decidedly disagreeable odor and taste. These resemble a mixture of gasolene and castor oil. This oil also rapidly turns rancid. A sample of such oil, treated by my process at 250° C. for 1½ hours was found to be free from disagreeable odor and taste, and had a sweet nutty flavor. It was also rendered stable.

I call attention to the fact that there should be a free outlet provided in all cases, for the hydrogen gas to carry off the odoriferous impurities from the oil under treatment. Mere agitation of the oil and hydrogen is not sufficient. The process comprises the step of distilling off the impurities of the oil in a current of hydrogen, and the temperature will vary with the particular oil, impurities present, etc. Various temperatures between 100° and 300° C. have been found suitable with various oils, but it is obvious that the oil should in no case be heated so strongly as to injure the same, although it is to be noted that the oil, while being subjected to the action of a current of hydrogen, will stand being heated to a somewhat higher temperature than could safely be employed, if other gases were used, without developing a "burnt" taste.

I am aware that various other kinds of gases and vapors, such as air, steam, alcohol vapor and the like have been used in a similar manner for purifying oils. Many of the impurities which are removed by my process cannot be removed by such agents, and moreover these agents all tend to render the oil readily decomposable, whereas my process stabilizes the oil, and renders it less liable to decomposition than the raw oil treated.

The treatment of oil with a current of hydrogen, at elevated temperatures for the removal of its impurities, in accordance with the foregoing description, I term "hydrogen distillation," as being analogous to the so called "steam distillation" extensively used in the preparation of pharmaceutical preparations from plants.

In my process, no appreciable amounts of the fats are removed by the hydrogen distillation, but the free fatty acids are largely removed.

While it is not entirely necessary, it is found to be advisable to remove the air from the vessel above the oil, at the commencement of the process, since under these conditions the oil is less liable to be injured by the heat.

While there is a reduction of the iodin number of the oil during the treatment, and probably some hydrogenation takes place, the oil is not "hardened" in the general acceptation of the term.

What I claim is:—

1. A process of purifying fatty oils which comprises passing a current of gas consisting essentially of hydrogen, through the oil, at an elevated temperature, in the absence of hydrogenating catalysts.

2. A process of purifying fatty materials which comprises distilling, in a current of hydrogen, at least a material proportion of the impurities which produce undesired odor and taste therein, said fatty materials being substantially free from hydrogenating catalysts.

3. A process which comprises maintaining a fatty oil at an elevated temperature, and then passing a current of a hydrogen-containing gas therethrough, without adding a catalytically acting material thereto.

4. The process of purifying fatty oils by hydrogen distillation of at least a part of its impurities, in the substantial absence of hydrogenating catalysts.

5. The step of distilling from a fatty oil, in the absence of air and hydrogenating catalysts, at least a portion of the impurities therein, in a current of hydrogen, at a temperature below that capable of injuring the oil under treatment.

6. The herein described process which comprises maintaining a volume of a fatty oil containing malodorous ingredients, at a temperature of 100° C. to 300° C., and passing hydrogen gas therethrough, in the absence of hydrogenating catalysts, and leading off the hydrogen gas carrying the vaporized malodorous ingredients.

7. In the purification of fatty oils, the herein described improvement comprising the removal of air from contact with the oil, and thereafter heating the oil and passing a current of hydrogen containing gas therethrough, in the absence of intentionally added hydrogenating catalysts.

8. A process of treating fatty oils which comprises distilling from said oil, while maintained at a temperature approaching 300° C., some at least of the impurities contained in said oil, by bubbling a current of hydrogen gas therethrough, and providing a free exit for the gas carrying the volatilized impurities.

In testimony whereof I have affixed my signature.

WALTER P. SCHUCK.